US012775468B2

(12) United States Patent
Xiong et al.

(10) Patent No.: US 12,775,468 B2
(45) Date of Patent: Oct. 27, 2026

(54) CONFIGURING PERIPHERAL DEVICES INTEGRATED IN MULTIPLE MONITORS

(71) Applicant: DELL PRODUCTS L.P., Round Rock, TX (US)

(72) Inventors: Dengzhai Xiong, Singapore (SG); Vui Khen Thien, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/922,587

(22) Filed: Oct. 22, 2024

(65) Prior Publication Data

US 2026/0111239 A1 Apr. 23, 2026

(51) Int. Cl.

*G06F 9/40* (2006.01)
*G06F 1/16* (2006.01)
*G06F 3/14* (2006.01)
*G06F 9/4401* (2018.01)
*G09G 5/00* (2006.01)

(52) U.S. Cl.

CPC .......... *G06F 9/4413* (2013.01); *G06F 1/1605* (2013.01); *G06F 3/1423* (2013.01); *G09G 5/006* (2013.01); *G09G 2370/04* (2013.01)

(58) Field of Classification Search

None
See application file for complete search history.

(56) References Cited

U.S. PATENT DOCUMENTS 6,466,982 B1 10/2002 Ruberg
6,577,337 B1 * 6/2003 Kang .................... G09G 5/006 348/211.3
7,554,510 B1 * 6/2009 Grigor .................. G06F 3/1438 345/3.1
9,454,260 B2 * 9/2016 Campbell ............. G06F 3/0428
9,600,220 B2 * 3/2017 Drake ................ G06Q 30/0267
(Continued)

FOREIGN PATENT DOCUMENTS

WO WO-2025016130 A1 * 1/2025 ......... G06F 3/04847

OTHER PUBLICATIONS

Machine Translation of WIPO Publication WO 2023210920 A1, published Nov. 2, 2023. (Year: 2023).*
(Continued)

*Primary Examiner* — Steven G Snyder
(74) *Attorney, Agent, or Firm* — Larson Newman, LLP

(57) ABSTRACT

A system for configuring peripheral devices integrated in multiple monitors communicatively coupled with an information handling system includes a multimonitor device-enabling profile (MDEP) generator. The MDEP generator is configured to receive an input indicating a configuration of the peripheral devices corresponding to a layout of the multiple monitors and to generate an MDEP for the multiple monitors based on the input received. The system includes an MDEP communicator operatively coupled with the MDEP generator and with the multiple monitors. The MDEP communicator is configured to communicate the MDEP to each of the multiple monitors in response to an external event detected by the system. The MDEP conveys instructions to the multiple monitors to cause one or more of the multiple monitors to configure at least one of the peripheral devices according to the configuration corresponding to the layout.

20 Claims, 6 Drawing Sheets

(56) References Cited

U.S. PATENT DOCUMENTS

| | | | | |
|---|---|---|---|---|
| 9,659,548 | B2 * | 5/2017 | Hu | G09G 5/32 |
| 10,264,186 | B2 * | 4/2019 | Lei | H04M 1/0264 |
| 10,365,877 | B2 * | 7/2019 | Jeacocke | G06F 3/1423 |
| 10,545,717 | B2 * | 1/2020 | Harviainen | G06F 3/147 |
| 10,616,489 | B2 * | 4/2020 | Lei | H04N 23/90 |
| 10,812,713 | B2 * | 10/2020 | Thai | H04N 23/667 |
| 11,356,607 | B2 * | 6/2022 | Thai | H04N 23/60 |
| 11,681,571 | B2 * | 6/2023 | Vajravel | G06F 9/44505 719/328 |
| 2003/0041189 | A1 | 2/2003 | Choi et al. | |
| 2010/0238089 | A1 * | 9/2010 | Massand | G09G 5/14 345/1.1 |
| 2010/0328447 | A1 * | 12/2010 | Watson | H04N 7/183 345/1.3 |
| 2014/0380201 | A1 * | 12/2014 | Massand | G06F 3/0481 715/761 |
| 2015/0304526 | A1 * | 10/2015 | Maurice | H04N 21/43635 348/513 |
| 2018/0091758 | A1 * | 3/2018 | Lee | G06F 13/4282 |
| 2019/0007620 | A1 * | 1/2019 | Lei | H04N 23/531 |
| 2019/0075240 | A1 * | 3/2019 | Thai | G06F 1/1618 |
| 2020/0412953 | A1 * | 12/2020 | Thai | G06F 1/1647 |
| 2023/0098066 | A1 * | 3/2023 | Vajravel | G06F 9/44505 719/328 |
| 2023/0315153 | A1 * | 10/2023 | Dias Duarte | G06F 1/1649 361/679.27 |
| 2023/0315262 | A1 * | 10/2023 | Surana | G06F 3/0484 715/204 |
| 2025/0077155 | A1 * | 3/2025 | Pang | G06F 3/1423 |

OTHER PUBLICATIONS

'HP PCs—Using two or more monitors with one computer (Windows 11, 10)' archived on Dec. 17, 2023. (Year: 2023).*

Machine Translation of Chinese Patent Application CN 120523756 A, published Aug. 22, 2025. (Year: 2025).*

* cited by examiner

400

402

| Layout# | M1 | M2 | M3 | M4 |
|---|---|---|---|---|
| Layout 1 | {D1, D2, D3} = {1, 0, 0}<br>{USB_D1, USB_D2, USB_D3} = {1, 0, 0} | {D1, D2, D3} = {0, 1, 0}<br>{USB_D1, USB_D2, USB_D3} = {1, 0, 0} | | |
| Layout 2 | {D1, D2, D3} = {1, 0, 0}<br>{USB_D1, USB_D2, USB_D3} = {1, 0, 0} | {D1, D2, D3} = {0, 1, 0}<br>{USB_D1, USB_D2, USB_D3} = {1, 0, 0} | {D1, D2, D3} = {0, 0, 1}<br>{USB_D1, USB_D2, USB_D3} = {1, 0, 0} | |
| Layout 3 | {D1, D2, D3} = {1, 0, 0}<br>{USB_D1, USB_D2, USB_D3} = {1, 0, 0} | {D1, D2, D3} = {0, 0, 0}<br>{USB_D1, USB_D2, USB_D3} = {0, 1, 0} | {D1, D2, D3} = {1, 0, 0}<br>{USB_D1, USB_D2, USB_D3} = {0, 0, 1} | {D1, D2, D3} = {0, 0, 0}<br>{USB_D1, USB_D2, USB_D3} = {1, 1, 1} |
| | 1 = enabled, 0= disabled | | | |

CONFIGURING PERIPHERAL DEVICES INTEGRATED IN MULTIPLE MONITORS

FIELD OF THE DISCLOSURE

The present disclosure generally relates to information handling systems, and more particularly relates to automated configuring of peripheral devices integrated in multiple monitors connected to a single information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system for configuring peripheral devices integrated in multiple monitors communicatively coupled with an information handling system includes a multimonitor device-enabling profile (MDEP) generator. The MDEP generator is configured to receive an input indicating a configuration of the peripheral devices corresponding to a layout of the multiple monitors and to generate an MDEP for the multiple monitors based on the input received. The system includes an MDEP communicator operatively coupled with the MDEP generator and with the multiple monitors. The MDEP communicator is configured to communicate the MDEP to each of the multiple monitors in response to an external event detected by the system. The MDEP conveys instructions to the multiple monitors to cause one or more of the multiple monitors to configure at least one of the peripheral devices according to the configuration corresponding to the layout.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
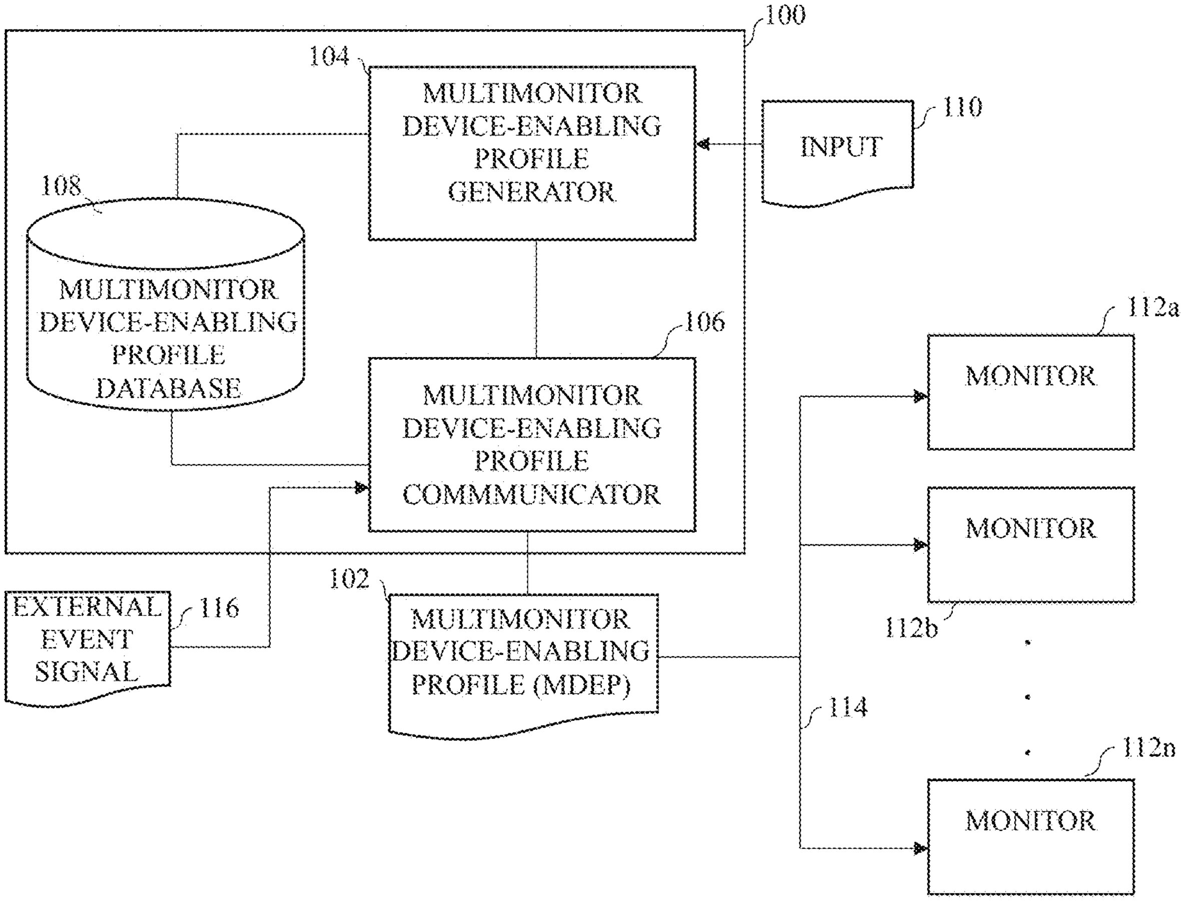
FIG. 1 is a block diagram of an example system for configuring peripheral devices integrated in multiple monitors communicatively coupled with a single information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

An I/O device that is frequently encountered not only with desktops, but also with other types of information handling systems, is a monitor that typically includes a screen (e.g., touchscreen and/or video display) configured to visually render information generated by the information handling system to which the monitor is operatively coupled. A monitor setup is an arrangement and configuration of one or more monitors operatively coupled to a single information handling system. A not-uncommon monitor set up involves multiple monitors coupled to the information handling system. For example, a dual-monitor setup with two monitors side by side, each operatively coupled to a desktop, extends a user's view and facilitates multitasking. A three-monitor setup, for example, is often used by professionals, designers, and gamers who benefit from the panoramic view that the three screens of the respective monitors may provide. In specialized fields such as stock trading and video editing, for example, four or more monitors may be operatively coupled with a single information handling system. Regardless of the number of monitors, each monitor setup may be specifically configured with respect to screen resolutions, orientations, and the way the displays are arranged.

A monitor coupled with an information handling system may include one or more peripheral devices, such as a camera, microphone, speakers and/or other type of peripheral device. The operating system running on the information handling system enumerates each such peripheral device by assigning a unique identifier to the peripheral device. The peripheral device is enumerated in response to the peripheral device being detected by the operating system, which recognizes the peripheral device, loads the necessary drivers, and makes the peripheral device available to the user.

A monitor layout refers to the physical arrangement of multiple monitors, including the positioning of each monitor relative to the other monitors (e.g., side-by-side, stacked, or in a combination of landscape and portrait orientations). The layout of the monitors is intended to optimize physical space, as well as enhance the comfort and productivity of the user.

A monitor setup includes the physical layout of multiple monitors but moreover encompasses the entire configuration of the monitor. The setup thus includes not only the physical layout but also software settings (e.g., resolution and display scaling) as well as multimonitor interaction (e.g., extending or duplicating displays) and hardware adjustments. As used herein with respect to peripheral devices (e.g., cameras, speakers, microphones) integrated or embedded in the monitor, the terms "configure" and "configuring" include setting operative parameters (e.g., microphone or speaker volume) as well as enabling or disabling the operation of the peripheral devices. Each instance of configuring a peripheral device's operative parameters is followed by the enabling or disabling of the peripheral device subsequently.

FIG. 1 illustrates an example system 100 for configuring peripheral devices embedded or integrated in multiple monitors that communicatively couple with a single information handling system, according to an embodiment of the present disclosure. A function of system 100 is the creation of multimonitor device-enabling profile (MDEP) 102 that causes the multiple monitors to configure integrated peripheral devices according to an input. As explained below, configuring the peripheral devices increases the likelihood of optimal use of the information handling system's software and hardware resources. System 100 overcomes certain challenges related to monitor-integrated peripheral devices, including ones stemming from the fact that, increasingly, off-the-shelf monitors integrate the same set of peripheral devices.

Embedding the same peripheral devices such as a camera, speaker, and microphone in each of multiple monitors communicatively coupled with a single information handling device may pose several problems. A user engaging in an online conference, for example, needs use only a single camera, microphone, and set of speakers-probably the ones embedded in the monitor directly in front of the user, the ones in the other monitors merely being redundant. It may be tedious, time consuming, or even confusing for the user to have to select among multiple peripheral devices when performing a setup using online conferencing software.

Apart from user inconvenience, duplicative peripheral devices may also be wasteful of software and/or hardware processing resources. USB data bandwidth, for example, is assigned to each device enumerated by the operating system running on the information handling system. Given the bandwidth limit of the connectivity protocol, bandwidth would be better taken from the redundant peripherals and allocated to other functions, such as higher video refresh rates. In addition to unnecessary usage of hardware and/or software resources, redundancy of peripheral devices may increase the likelihood of system problems or failures.

Referring still to FIG. 1, system 100 illustratively includes MDEP generator 104, MDEP communicator 106, and MDEP database 108. MDEP generator 104, MDEP communicator 106, and MDEP database 108 can be implemented in hardwired circuitry of an information handling system, in executable code (software) configured to run on one or more processors of the information handling system, or a combination of circuitry and software.

MDEP generator 104 is configured to receive input 110. Input 110 indicates for each monitor, among multiple monitors coupled with a single information handling system, a specific configuration for one or more peripheral devices integrated in each monitor. As explained in greater detail below, input 110 may be one of various types of user input or may be one or more system-received signals. Each input-specified configuration of the one or more peripheral devices corresponds to a specific layout of the multiple monitors operatively coupled with the information handling system.

Operatively, MDEP generator 104 is configured to generate MDEP 102 based on input 110. MDEP generator 104 generates MDEP 102 by mapping the input-specified configuration of one or more peripheral devices to a specific layout of multiple monitors 112*a* and 112*b* through 112*n*.

MDEP communicator 106 operatively couples with MDEP generator 104 and with multiple monitors 112*a*-112*n*, and is configured to communicate MDEP 102 to each of the monitors. Although three multiple monitors are explicitly shown, multiple monitors 112*a*-112*n* may be as few as two or may be three or more. Integrated in each of multiple monitors 112*a*-112*n* is one or more peripheral devices (not explicitly shown).

External event signal 116 initiates MDEP communicator 106'*s* communication of MDEP 102 to multiple monitors 112*a*-112*n*. MDEP 102 conveys instructions to multiple monitors 112*a*-112*n* to cause one or more of the multiple monitors to configure at least one integrated peripheral device. The configuration effected by MDEP 102 is according to the configuration specified by input 110 and mapped to the layout of monitors 112*a*-112*n*.

Figure 2:
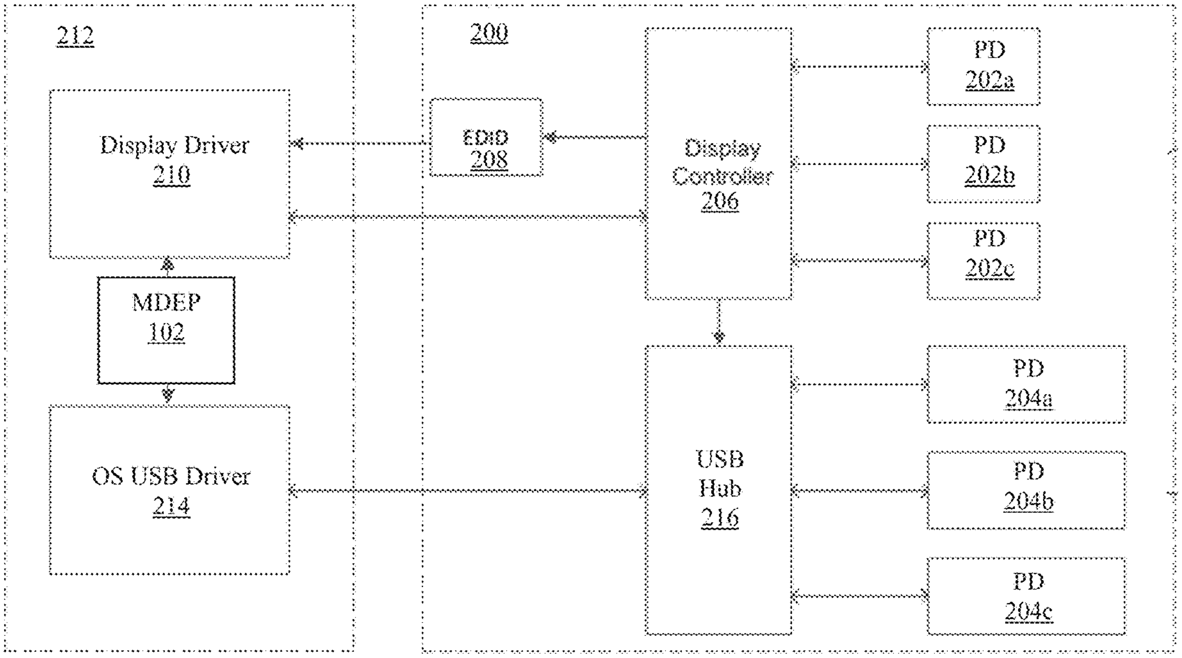
FIG. 2 is a block diagram of an example monitor in which multiple peripheral devices are integrated and are configured by the system of FIG. 1 according to an embodiment of the present disclosure.

FIG. 2 illustrates an example monitor 200 in which multiple peripheral devices (PDs) 202*a*, 202*b*, 202*c*, 204*a*, 204*b*, and 204*c* are integrated and configured by system 100, according to an embodiment of the present disclosure. PDs 202*a*-202*c* are managed by display controller 206. Instructions controlling PDs 202*a*-202*c* are communicated directly to the peripheral devices by display controller 206 via a communication bus (e.g., inter-integrated circuit (I2C) bus). Functions of PDs 202*a*-202*c* may be enumerated in Extended Display Identification Data (EDID) 208, a declaration that communicates the peripheral devices' capabilities to display driver 210 of operating system 212. The functions may be Video Electronics Standards Association (VESA) functions or manufacturer-specified proprietary functions. PDs 204*a*-204*c* are USB peripheral devices, which are detected by USB driver 214 of operating system 212 and enumerated directly by the driver. Display controller 206 may control USB hub 216. In certain embodiments, MDEP 102 is communicated by MDEP communicator 106 to both display driver 210 and to USB driver 214. Via display driver 210 the instructions of MDEP 102 are conveyed to display controller 206 to configure PDs 202*a*-202*c*. Via USB driver 214, the instructions of MDEP 102 are conveyed to USB hub 216 to configure PDs 204*a*-204*c*.

Figure 3:
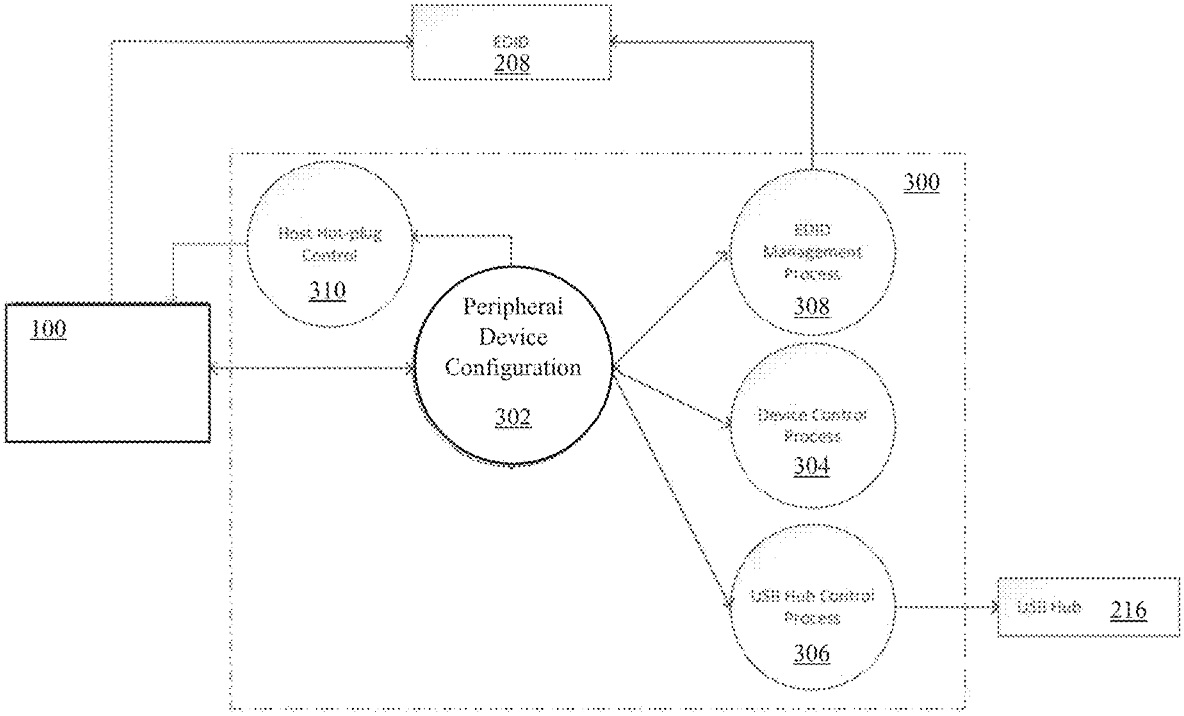
FIG. 3 illustrates certain operative procedures performed by a monitor based on instructions conveyed by a multimonitor device-enabling profile generated by the example system of FIG. 1 according to an embodiment of the present disclosure.

FIG. 3 illustrates example operative procedures 300 performed by example monitor 200 in response to receiving MDEP 102 instructions (FIG. 2). Peripheral device configuration process 302 is performed by example monitor 200 in response to and based on MDEP 102. In accordance with peripheral device configuration process 302, example monitor 200 performs device control process 304, USB hub process 306, and EDID management process 308. Device control process 304 directly enables or disables one or more of PDs 202*a*-202*c*. USB hub process 306 enables or disables one or more of PDs 204*a*-204*c* by enabling or disabling a USB port or path to the one or more USB peripheral devices. EDID management process 308 generates EDID 208, the declaration having reconfigured EDID blocks according to the new functionality of the configuration made in response to MDEP 102.

In accordance with the embodiment illustrated in FIG. 3, when MDEP 102 is communicated to each of monitors 112*a*-112*n*, a display controller of each monitor may enable or disable at least one embedded peripheral device. The display controller of each monitor may command a USB hub or port to enable or disable at least one USB peripheral device. Each monitor's display controller may reconfigure content of a corresponding EDID to reflect the changed functionality of the newly established configuration of peripheral devices effected by MDEP 102.

Although MDEP 102 may be created by MDEP generator 104 in accordance with certain configuration preferences of a user as conveyed by input 110, the user is likely to have different configuration preferences depending on the specific monitor layout. Accordingly, MDEP 102 may be one of multiple, different MDEPs that each correspond to a different monitor layout. For example, one MDEP may correspond to a side-by-side layout of multiple monitors. A different MDEP may correspond to a stacked layout, for example. Still a different MDEP may correspond to a combination of landscape and portrait layouts, and so on. MDEP 102 and the different MDEPs thus may convey different sets of instructions to multiple monitors 112*a*-112*n* to cause one or more of the multiple monitors to configure at least one integrated peripheral device according to the different configurations corresponding to the different monitor layouts. MDEP database 108 may electronically store MDEP 102 along with multiple other MDEPs, each corresponding to a different configuration of peripheral devices depending on the specific layout of multiple monitors 112*a*-112*n* in which the peripheral devices are embedded.

Figure 4:
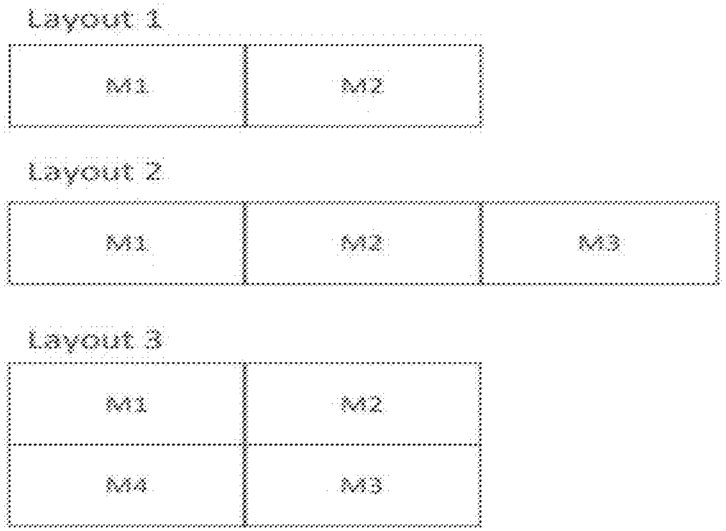
FIG. 4 illustrates examples of different multimonitor device-enabling profiles generated by the example system of FIG. 1, each generated profile corresponding to a different monitor layout according to an embodiment of the present disclosure.

FIG. 4 illustrates three different monitor layouts 400 and three corresponding MDEPs 402. Monitor layouts 400 are layout 1, layout 2, and layout 3. Layouts 1 and 2 are each side-by-side arrangements, the first having two monitors, M1 and M2, and the second have three monitors, M1, M2, and M3. Layout 3 includes two side-by-side arrangements, M1 and M2, which are stacked on another pair of side-by-side monitors M3 and M4. MDEPs 402 indicate that each of the monitors in each of the layouts includes six peripheral devices: three display controller-managed devices D1, D2, and D3 and three USB devices, USB_D1, USB_D2, and USB_D3. Illustratively, each MDEP provides a configuration indicating which peripheral devices to enable and which to disable, the MDEPs having binary data (zero for disabled and one for enabled) indicating each configuration. Note, however, that as used herein "enabling" refers to more than merely activating or powering-up a peripheral device. In various other embodiments, an MDEP may dictate more complex configurations using different data fields. For example, the MDEP may dictate configurations that include data indicating display brightness levels, speaker volume levels, and/or other peripheral device control variables. Each instance of configuring one or more operative parameters of a peripheral device is followed by the enabling or disabling of the peripheral device subsequently.

While different MDEPs correspond to different monitor layouts, the same MDEP may be invoked by different external events. For example, the external event may be a user input that follows immediately after (or nearly so) input 110, which is also input by the user. Input 110 may specify a specific configuration corresponding to a specific monitor layout of multiple monitors 112*a*-112*n*. MDEP generator 104 generates MDEP 102 by mapping the user-specified configuration of input 110 to the monitor layout (e.g., the present layout), and in response to the subsequent external event 116 (i.e., the follow-on user input immediately or soon thereafter), MDEP communicator 106 communicates MDEP 102 to multiple monitors 112*a*-112*n*.

In other embodiments, different external events may cause MDEP communicator 106 to communicate MDEP 102 to monitors 112*a*-112*n*. The external events may include ones that automatically cause MDEP communicator 106 to communicate a previously generated MDEP to monitors 112*a*-112*n*. System 100, in some embodiments, is configured to detect the user's editing of prespecified configuration preferences associated with an MDEP electronically stored in MDEP database 108. MDEP generator 104 may automatically respond to detecting the user's editing by generating a revised MDEP, which MDEP communicator 106 automatically conveys to monitors 112*a*-112*n*.

In certain embodiments, the external event may be a change in monitor layout detected by system 100. System 100 may be integrated with or operatively coupled to one or more sensors that detect the change in monitor layout. The sensor, in some arrangements, may be one or more edge sensors, for example, that monitor and measure the position of an edge of one or more monitors. Sensing movement of one or more monitors, system 100 may identify a new monitor layout, select a corresponding MDEP stored in MDEP database 108, and prompt MDEP communicator 106 to communicate the selected MDEP to monitors 112*a*-112*n*.

In still other embodiments, the external event may be a user-initiated or an automatic initiation of an online conference call or meeting. For example, the external event may be an initiation of a Unified Communications (UC) setup. Each of monitors 112*a*-112*n* may have an integrated or embedded camera, microphone, and set of speakers. System 100 may be configured to select an appropriate MDEP from MDEP database 108 and cause MDEP communicator 106 to communicate the selected MDEP to monitors 112*a*-112*n*. The MDEP selected may cause one monitor to enable its camera, microphone, and speaker set, while also causing each of the other monitors to disable their microphones, speakers, and cameras. The MDEP optionally may cause placement of a UC window on the monitor in which the monitor's camera is enabled. Another external event may be a subsequent external event that signals the breakdown of the UC setup. In certain embodiments, system 100 is configured to respond to the subsequent external event by selecting another MDEP from MDEP database 108 and prompting MDEP communicator 106 to communicate it to monitors 112*a*-112*n*. The subsequently conveyed MDEP may cause monitors 112*a*-112*n* to reconfigure their peripheral devices thereby creating a configuration of the peripheral devices that is the same as the one that preceded the change stemming from initiation of the UC setup.

In yet other embodiments, an external event may be a plug-and-play (PnP) signal. The PnP signal may indicate the addition of another monitor, or a new peripheral device added to a monitor already communicatively coupled with the information handling system, either event resulting in a new monitor layout. MDEP 102 may have been previously generated by MDEP generator 104 and stored electronically in MDEP database 108. System 100 may be configured to detect the PnP signal. In response to detecting the PnP signal, system 100 may prompt MDEP communicator 106 to communicate MDEP 102 to multiple monitors 112*a*-112*n*. MDEP 102 dictates a configuration of the monitors and monitors'peripheral devices, including the device (i.e., monitor or monitor-integrated peripheral) newly added as indicated by the PnP signal.

Figure 5:
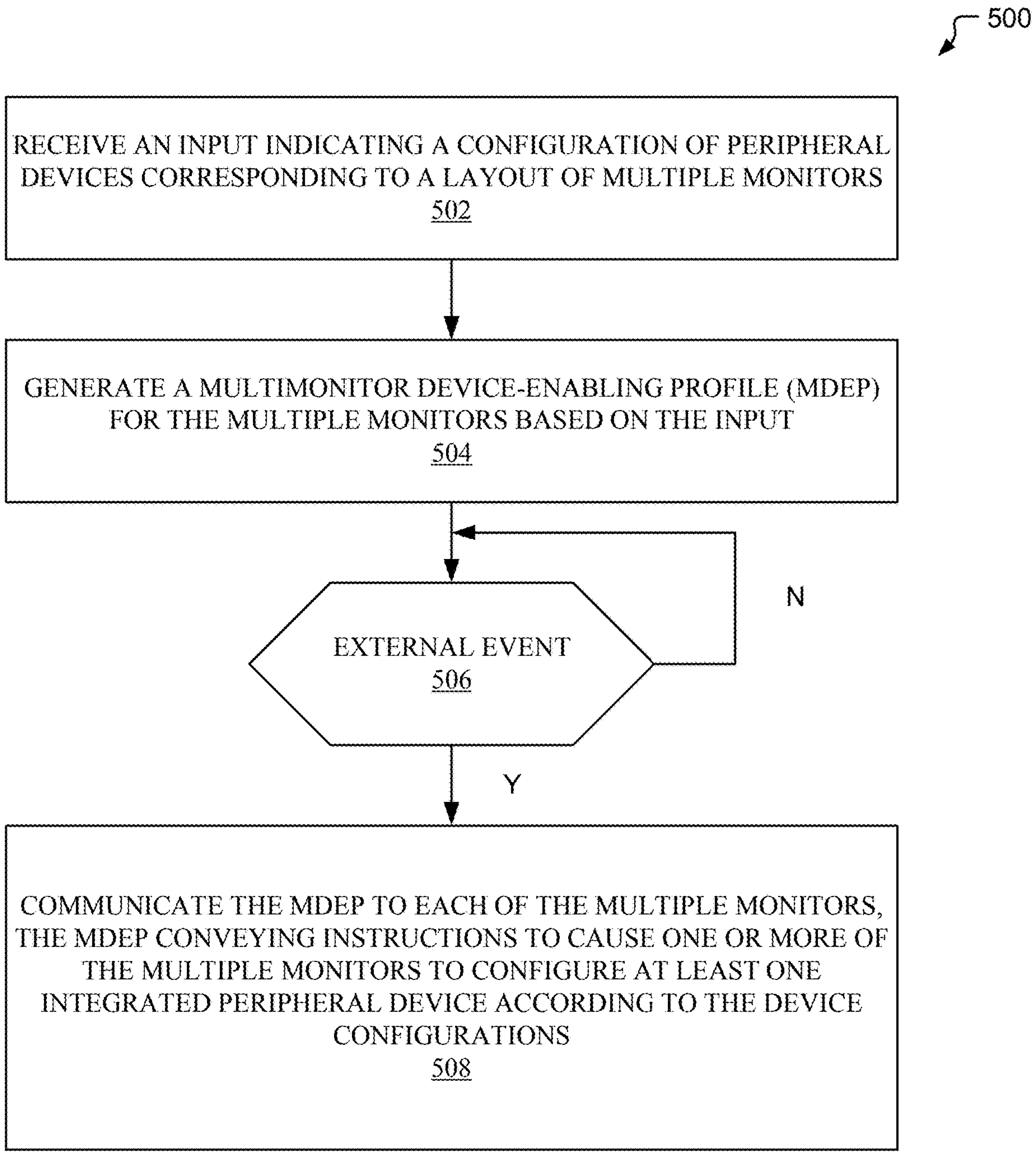
FIG. 5 is a flow diagram of a method of configuring peripheral devices integrated in multiple monitors communicatively coupled with an information handling system according to an embodiment of the present disclosure.

FIG. 5 is a flow diagram of a method 500 of configuring peripheral devices integrated or embedded in multiple monitors communicatively coupled with an information handling system according to an embodiment of the present disclosure. It will be readily appreciated that not every method step of method 500 as set forth in this flow diagram is always necessary, and that certain steps of the methods may be combined, performed simultaneously, in a different order, or omitted, without varying from the scope of the disclosure.

Method 500 may be performed by a system such as system 100 described in connection with FIGS. 1-4. At block 502, the system receives an input indicating a configuration of the peripheral devices integrated or embedded in the multiple monitors. The input may be a user input that specifies preferences for one or more configurations of the peripheral devices, each configuration corresponding to a specific layout of the multiple monitors. The input, additionally or alternatively, may be one or more signals generated in response to an initial arrangement or a rearrangement of the multiple monitors thereby effecting a specific layout of the multiple monitors. In each case, a configuration of the peripheral devices corresponds to a specific layout of the multiple monitors.

At block 504, the system generates an MDEP for the multiple monitors. The MDEP is generated by the system based on the received input. The system generates the MDEP by mapping a specific monitor layout to a specific configuration of the peripheral devices integrated or embedded in the multiple monitors.

At block 506, if an external event is detected, then at block 508 the system communicates the MDEP to each of the multiple monitors. The MDEP conveys instructions to the multiple monitors. The instructions cause one or more of the multiple monitors to configure at least one peripheral device according to the configuration corresponding to the layout of the multiple monitors.

In certain embodiments of method 500, the external event that prompts the communication of the MDEP to each of the multiple monitors may be a change in the monitor layout. The change in the monitor layout may be communicated to the system by a user input which indicates the nature of the change, such as a reconfiguration of the layout of the multiple monitors. In other embodiments, the change in the monitor layout may be detected in response to signals generated by one or more sensors communicatively coupled with the system. For example, edge sensors attached to one or more monitors may trigger signal generation in response to a physical movement of one or more monitors. In certain embodiments, the sensor-generated signals may prompt the system to automatically select from among multiple MDEPs electronically stored in a database a specific MDEP that corresponds to the changed monitor layout. The system then may automatically communicate the selected MDEP to the multiple monitors to cause the monitors to configure the peripheral devices accordingly.

In other embodiments of method 500, an external event, for example, may be an initiation of a Unified Communications (UC) setup. If more than one of the multiple monitors includes a microphone, speakers, and camera, then the MDEP may cause one monitor to enable its microphone, speakers, and camera and cause the other monitors to each disable their microphones, speakers, and cameras. In certain embodiments, the MDEP additionally may cause the placement of a UC window on one of the multiple monitors. In some embodiments, if the initiation of the UC setup is followed by a subsequent external event signaling the breakdown of the UC setup, then the external event may prompt the MDEP communicator to communicate a subsequent MDEP thereby causing the multiple monitors to each reconfigure their peripheral devices to create the same configuration as the one preceding the initiation of the UC setup.

In still another embodiment of method 500, the external event, for example, may be a plug-and-play (PnP) signal that indicates the addition a new device, either a newly added monitor or the addition of a new peripheral device to a monitor already communicatively coupled with the information handling system. Either event may create a new monitor layout. Accordingly, the PnP signal may prompt the system to select a previously generated MDEP and cause the MDEP communicator to communicate the MDEP to the multiple monitors.

Figure 6:
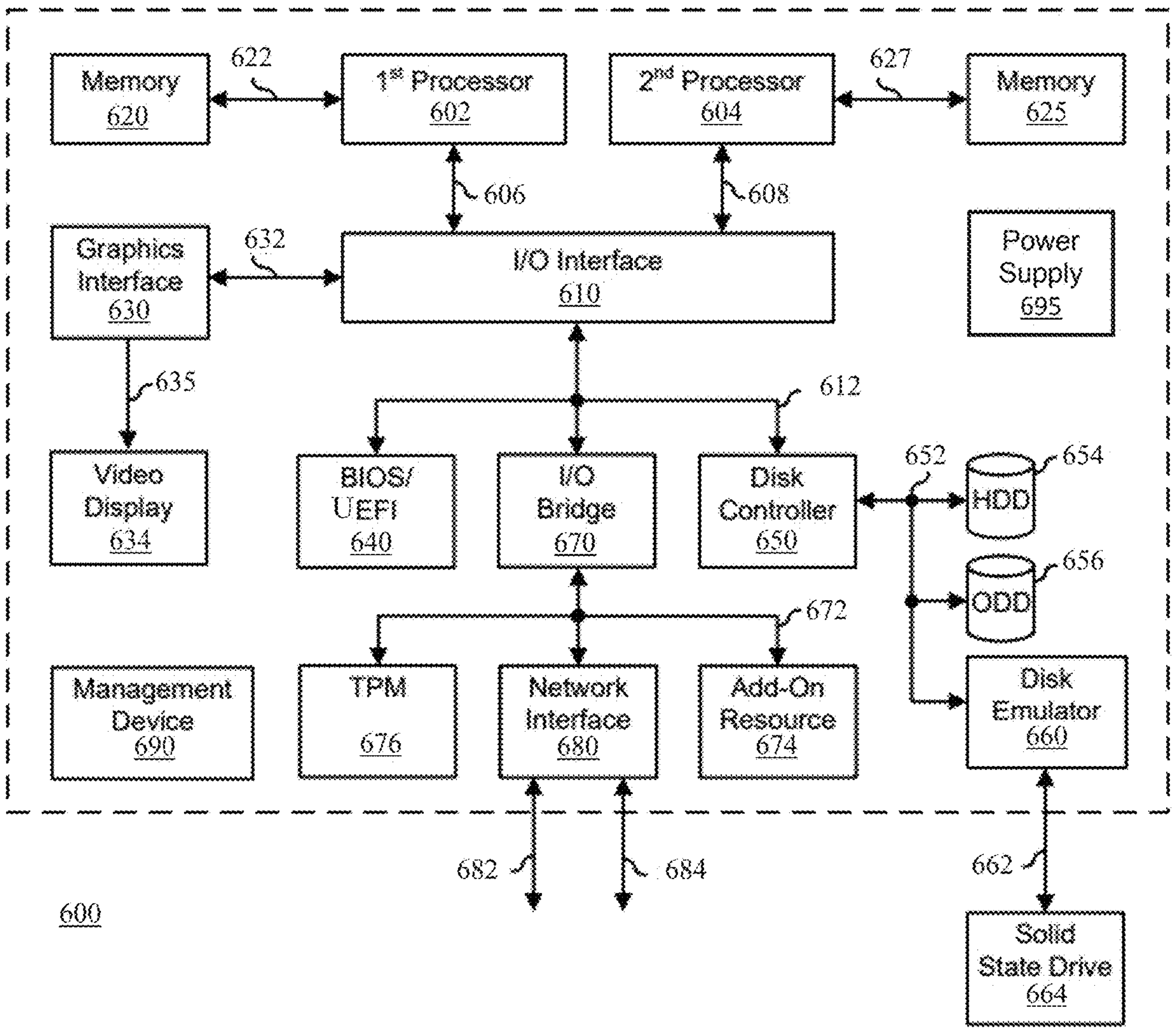
FIG. 6 is a block diagram of a general information handling system according to an embodiment of the present disclosure.

FIG. 6 shows a generalized embodiment of an information handling system 600 according to an embodiment of the present disclosure. Information handling system 600 may be one that communicatively couples with multiple monitors in which peripheral devices are embedded and are automatically configured by a system such as system 100 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable mediums for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 664, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 664, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

That which is claimed is:

1. A system for configuring peripheral devices integrated in multiple monitors communicatively coupled with an information handling system, the system comprising:

a multimonitor device-enabling profile (MDEP) generator configured to receive an input indicating a configuration of the peripheral devices corresponding to a layout of the multiple monitors and to generate an MDEP for the multiple monitors based on the input received; and an MDEP communicator operatively coupled with the MDEP generator and with the multiple monitors to communicate the MDEP to each of the multiple monitors in response to an external event detected by the system;

wherein the MDEP conveys instructions to the multiple monitors to cause one or more of the multiple monitors to configure at least one of the peripheral devices according to the configuration corresponding to the layout, wherein the one or more of the multiple monitors update Extended Display Identification Data based on the instructions, wherein the configuration of the at least one of the peripheral devices includes the one or more of the multiple monitors to command a universal serial bus (USB) hub disable at least one USB peripheral device of the one or more of the multiple monitors.

2. The system of claim 1, further comprising:

an MDEP database communicatively coupled with the MDEP generator and with the MDEP communicator;

wherein the MDEP database electronically stores the MDEP with a plurality of previously generated MDEPs, each of the previously generated MDEPs corresponding to a different layout of the multiple monitors and conveying instructions to the multiple monitors to cause one or more of the multiple monitors to configure at least one integrated peripheral device according to different device configurations.

3. The system of claim 1, wherein the external event is a change in a prior layout of the multiple monitors.

4. The system of claim 3, wherein the system communicatively couples to one or more sensors, and wherein the change is detected based on signals generated by the one or more sensors and received by the system.

5. The system of claim 1, wherein the external event is an initiation of a Unified Communications (UC) setup.

6. The system of claim 5, wherein the at least one peripheral device comprises a plurality of microphones, speakers, and cameras integrated in the multiple monitors, and wherein the MDEP causes the multiple monitors to enable one of the microphones, speakers, and cameras and to disable each of the other microphones, speakers, and cameras.

7. The system of claim 5, wherein the MDEP causes placement of a UC window on one of the multiple monitors.

8. The system of claim 5, wherein the initiation of the UC setup is followed by a subsequent external event signaling the breakdown of the UC setup, and wherein the subsequent external event prompts the MDEP communicator to communicate a subsequent MDEP causing at least one of the multiple monitors to reconfigure at least one integrated peripheral device to achieve a same configuration as one preceding the initiation of the UC setup.

9. The system of claim 1, wherein the external event is a plug-and-play (PnP) signal indicating an addition a new device communicatively coupled with the information handling system, and wherein the MDEP was previously generated and is communicated in response to the system detecting the PnP signal.

10. A method of configuring peripheral devices integrated in multiple monitors communicatively coupled with an information handling system, the method comprising:

receive an input indicating a configuration of the peripheral devices corresponding to a layout of the multiple monitors;

generating a multimonitor device-enabling profile (MDEP) for the multiple monitors based on the input; and communicating the MDEP to each of the multiple monitors in response to an external event detected by the system;

wherein the MDEP conveys instructions to the multiple monitors to cause one or more of the multiple monitors to configure at least one of the peripheral devices according to the configuration corresponding to the layout, wherein the one or more of the multiple monitors update Extended Display Identification Data based on the instructions, wherein the configuration of the at least one of the peripheral devices includes the one or more of the multiple monitors to command a universal serial bus (USB) hub disable at least one USB peripheral device of the one or more of the multiple monitors.

11. The method of claim 10, wherein the external event is a change in a prior layout of the multiple monitors.

12. The method of claim 11, wherein the system communicatively couples to one or more sensors, and wherein the method includes detecting the change based on signals generated by the one or more sensors and received by the system.

13. The method of claim 10, wherein the external event is an initiation of a Unified Communications (UC) setup.

14. The method of claim 13, wherein the at least one peripheral device comprises a plurality of microphones, speakers, and cameras integrated in the multiple monitors, and wherein the MDEP causes the multiple monitors to enable one of the microphones, speakers, and cameras and to disable each of the other microphones, speakers, and cameras.

15. The method of claim 13, wherein method includes placing a UC window on one of the multiple monitors in accordance with the MDEP.

16. The method of claim 13, wherein the initiation of the UC setup is followed by a subsequent external event signaling the breakdown of the UC setup, and wherein the method further includes communicating a subsequent MDEP in response to the subsequent external event, MDEP causing at least one of the multiple monitors to reconfigure at least one integrated peripheral device to achieve a same configuration as one preceding the initiation of the UC setup.

17. The method of claim 10, wherein the external event is a plug-and-play (PnP) signal indicating an addition a new device communicatively coupled with the information handling system, wherein the MDEP was previously generated, and wherein the method further includes communicating the MDEP to the multiple monitors in response to the system detecting the PnP signal.

18. An information handling system operatively coupled with multiple monitors in which one or more peripheral devices is integrated in each monitor, the information handling system comprising:

one or more processors; and a hardware-implemented memory configured to store executable instructions to cause the one or more processors to perform operations including:

generating a multimonitor device-enabling profile (MDEP) corresponding to a layout of the multiple monitors; and communicating the MDEP to the multiple monitors in response to an external event;

wherein the MDEP conveys instructions to the multiple monitors to cause one or more of the multiple monitors to configure at least one of the one or more peripheral devices, wherein the one or more of the multiple monitors update Extended Display Identification Data based on the instructions, wherein the configuration of the at least one of the peripheral devices includes the one or more of the multiple monitors to command a universal serial bus (USB) hub disable at least one USB peripheral device of the one or more of the multiple monitors.

19. The information handling system of claim 18, wherein the external event is an initiation of a Unified Communications (UC) setup.

20. The information handling system of claim 19, wherein the at least one integrated peripheral device comprises a plurality of microphones, speakers, and cameras integrated in the multiple monitors, and wherein the MDEP causes the multiple monitors to enable one of the microphones, speakers, and cameras and to disable each of the other microphones, speakers, and cameras.

* * * * *